Figure 4:
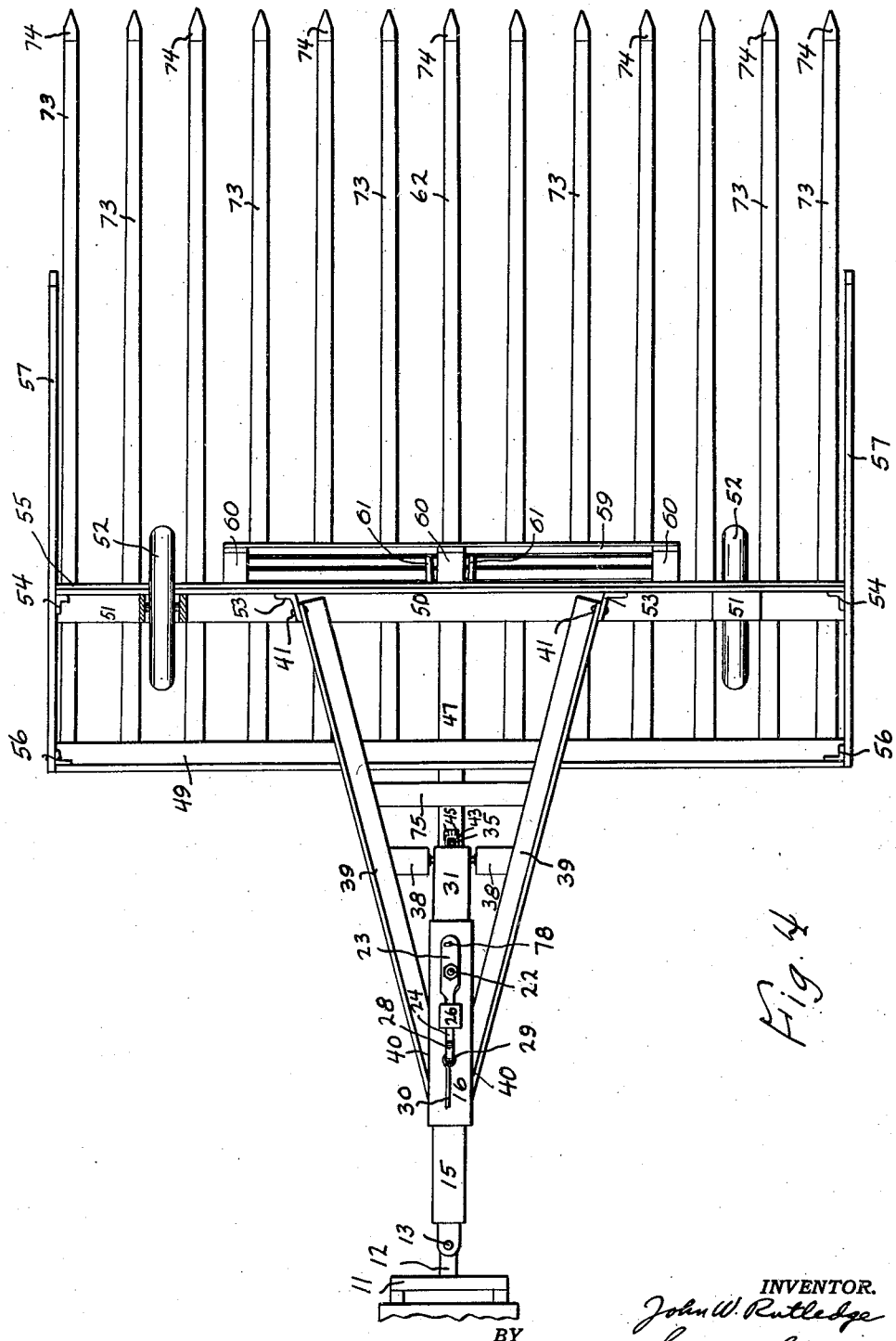

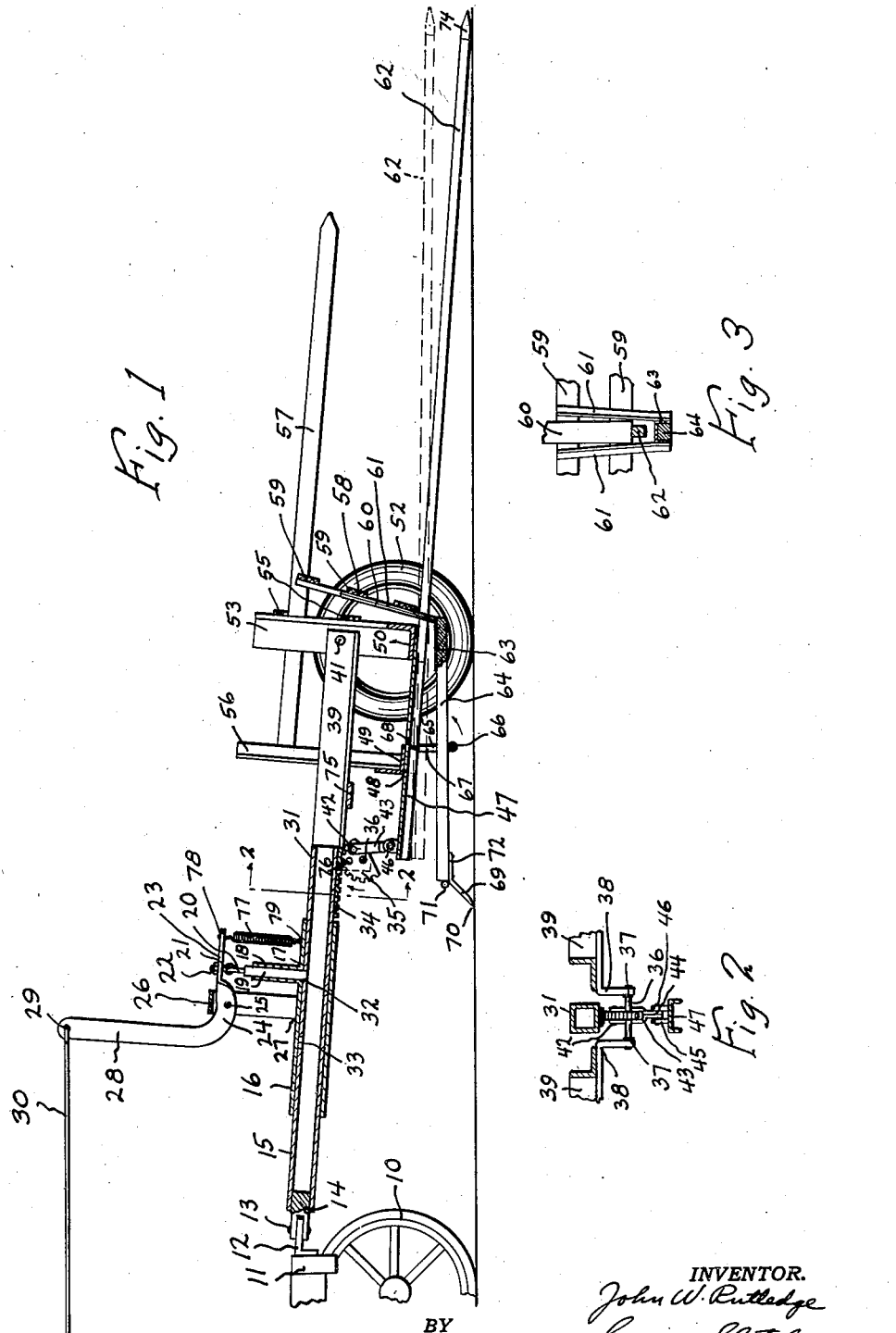

Patented Apr. 17, 1945

2,373,710

UNITED STATES PATENT OFFICE 2,373,710

LIFT FOR TRACTOR BUCK RAKES

John W. Rutledge, Early, Iowa

Application February 10, 1943, Serial No. 475,388

9 Claims. (Cl. 56—27)

My invention relates to buck rakes.

An object of my invention is to provide a buck rake which can be controlled from the front end of a tractor, and which includes means for tipping the buck rake so that the forward points thereof will pass beneath the hay or such material on the ground and then to provide a smoothly operating mechanism cooperative therewith to automatically raise the same as the tractor to which the rake is attached moves forwardly.

A further object of my invention is to provide a gear controlled mechanism to provide the above mentioned object and to provide further means for locking the arrangement in desired position.

A further object of my invention is to provide means for adjusting the degree of movement of the buck rake.

A further object of my invention is to provide a member in cooperation with the buck rake which will initiate or force the hay off of the same, which mechanism is further cooperant with said aforesaid tipping mechanism.

A further object of my invention is to provide a simple construction.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side view of the arrangement taken in section substantially along the longitudinal center thereof, Figure 2 is a sectional detail taken along the lines 2—2 of Fig. 1, Figure 3 is a further detail, and Figure 4 is a plan view of the arrangement.

I have used the character 10 to designate the forward tractor wheels and the character 11 the tractor frame. Attached to the member 11 is the apertured connecting member 12 which is pivotally attached at 13 to the further member 14. Solidly attached with the member 14 is the square hollow metal tube 15 which is slidably engaged within a further hollow square female tube 16. Attached at 17 to the outer tube 16 is the substantially vertically positioned square socket 18 in which is slidably received a square pin 19. Attached to the pin 19 is the member 20 which, in turn, is attached at 21 to the holder 22. The holder 22 is attached to the lever member 23 which lever member forms an integral continuation of the member 24 which is pivoted at 25 to the U-shaped member 26 which is attached at 27 to the member 16. The member 24 continues into the vertical portion 28 to which is attached at 29 the cable 30 which passes to the tractor.

The central hollow square tube 15 extends forwardly and includes the portion 31 and the tube 15 also includes a forward square opening at 32 and a rearward square opening at 33 to selectively register with the square pin 19. Attached to the portion 31 of the tube 15 is the substantially horizontal gear rack 34 which is adapted to mesh with the sector gear 35 which gear 35 is attached to the shaft 36 which shaft 36 is journalled at 37 (see Fig. 2) to the brackets 38 which brackets 38 are welded or otherwise attached to the angularly extending members 39 (see Figs. 2 and 4) which members 39 are rigidly attached at 40 to the square member 16 and are pivoted at 41 to the buck rake itself. Pivotally attached to the sector gear 35 by means of the pin 42 is the pair of links 43 which links 43 are joined together and are received at 44 between the ears 45 with a pin 46 providing a pivotal connection thereto. The ears 45 are attached to a channel member 47 which channel member, in turn, is attached at 48 to the transverse member 49 of the buck rake and the member 47 continues forwardly and is also attached to the further transverse angle member 50 of the buck rake. Attached to the member 50 are the vertical standards 51 in which are suitably journalled the wheels 52 and also attached to the members 50 are the vertically positioned angle members 53 which are pivotally attached to the aforesaid pivots 41.

Attached across the members 53 and the corner angles 54 are the transverse bars 55. The further angles 56 provide corner braces, and attached to the members 54 and 56 are the side members 57. A latticed push member is indicated at 58 which member includes the transverse slats 59 and the vertically positioned slats 60, there being a central slat 60. Straddling the central slat 60 are the angles 61 which are attached to the slats 59 and which angles are adapted to further straddle the central tine 62 of the buck rake, and the ends of the members 61 are also attached to a channel 63 in which is attached the rearwardly extending beam 64 which beam 64 passes between a U-shaped member 65 which U-shaped member includes the horizontal rollers 66 and the vertical roller 67 journalled thereon, and which U-shaped member 65 is pivotally attached at 68 at either inner side of the channel 47. The beam 64 continues rearwardly and is attached to the further angularly positioned member 69 which includes the point 70 and to which is welded the transverse rod 71, the member 69 being attached to the beam 64 by means of the continuation 72. The respective other tines of the rake are indicated by the character 73. Attached at the ends of the tines are suitable metal guards 74. The tines 62 and 73 are suitably attached to and beneath the members 50 and 49 and a further brace 75 (see Figs. 1 and 4) is attached across the members 39 to provide rigidity thereto.

Now that the structure of my device has been explained, I shall explain the operation thereof. As shown in Fig. 1, the device is in that position wherein the hay gathering tines 73 are in the ground engaging position or wherein the tractor has been backed up slightly and the pin 19 allowed to be forced into the forward opening 32. The tractor is then driven forwardly with the inclined tines 73 passing under the hay, which hay is then forced to the rear of the structure and up against the push member 58. The next step in the operation is that of bringing the tines to the horizontal position as shown by the dotted lines in Fig. 1. To accomplish this result, the cable 30 is drawn rearwardly which swings the lever 28 and correspondingly raises the pin 19 out of the opening 32. The tractor is then driven forward. As the tractor is driven forwardly, the inner hollow member 15 will travel forwardly and until the pin 19 registers with the opening 33, when it will snap into place.

During forward travel of the member 15, the gear rack 34 will also travel forwardly and by virtue of its meshed engagement with the sector gear 35, it will cause the gear 35 to rotate in the direction of the arrow as shown in Fig. 1, correspondingly causing the pivotal point 42 to be forced downwardly thereby forcing the link 43 downwardly and forcing the rear end of the entire rake structure downwardly which will, correspondingly, bring the tines to the horizontal position as shown. Conversely, to bring the tines to the ground, the action is reversed, which brings the gear to the position as shown in Fig. 1 with the sector gear thereby being rotated in the opposite direction. An additional opening at 76 in the sector gear is provided to allow for varied swinging adjustment of the tines. The hay is then transported after the mechanism is locked to the position desired to dump the same, and the tines are then brought to the ground engaging position in the manner described, and by drawing the cable 30 first to release the pin 19 when again it is locked in the position shown in Fig. 1. The tractor is then backed up and the point 70 is penetrated into the ground during such backing operation, and as the rake is then drawn rearwardly the push member 58 will remain in fixed position, and as the tines 73 and the central tine 62 are drawn therethrough, the hay on the tines will be forced off of the same.

As soon as the bar 71, which bar is slightly longer than the width of the U-shaped member 65, strikes against the U-shaped member 65, this member will be pivoted upwardly in the direction of the arrow releasing the point 70 from the ground and stopping movement of the push member. The push member need not travel all the way off of the tines since it needs only to initiate the removing action of the hay and need only travel a fairly substantial distance along the tines. It will thus be seen from the foregoing structure that all of the advantages of ready control of the arrangement such as tipping and the like, as well as removing the hay, are advantageously performed. It will also be noted that the sector gear, in combination with the gear rake, provides for a very smooth application of power to the tipping arrangement without any danger of jamming of links or other structures which are not necessary in the present structure. The opening 76, as explained, can be used if it is desired to shorten the movement of the links 43 by merely placing the pin 42 through the opening 76. The spring 77 is attached at 78 and 79 to the members 23 and 16 respectively to provide retraction of the lever 28.

It will now be seen that I have provided all of the advantages mentioned in the objects of my invention and other advantages being readily apparent.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor.

2. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, means for locking said inner member with respect to said receiving member including slots in said inner member corresponding to lowered or raised positions of the rake, means attached to said receiving member to slide into said slots.

3. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, means for locking said inner member with respect to said receiving member including slots in said inner member corresponding to lowered or raised positions of the rake, means attached to said receiving member to slide into said slots, including a vertically arranged tongue member, means for controlling said tongue member from the tractor.

4. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, means for locking said inner member with respect to said receiving member including slots in said inner member corresponding to lowered or raised positions of the rake, means attached to said receiving member to slide into said slots, including a vertically arranged tongue member, means for controlling said tongue member from the tractor, including a pivoted spring-urged lever having a vertical extension, said lever attached to said tongue member, and a control line attached to the upper end of said extension passing to said tractor.

5. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received member within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, said rake tipping means including a link pivotally attached to said gear member and to the rear end of said rake.

6. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, said rake tipping means including a link pivotally attached to said gear member and to the rear end of said rake, a further opening in said gear member to provide adjustable movement of said link.

7. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, a push member slidably engaged with said rake frame, means for retaining said push member in fixed position as the rake is drawn therethrough.

8. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, a push member slidably engaged with said rake frame, means for retaining said push member in fixed position as the rake is drawn therethrough, including a lengthened beam, a pointed member attached at the end thereof for ground engagement, means for limiting movement of said push member and raising said point out of ground engaging position during use thereof.

9. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including a gear rack attached to said inner member, a gear cooperant therewith, means positioned between said gear and the rear portions of said rake frame to pivot the same upon movement of said gear rack as said inner member is moved by said cooperative forward or rearward movement of said tractor, a push member slidably engaged with said rake frame, means for retaining said push member in fixed position as the rake is drawn therethrough, including a lengthened beam, a pointed member attached at the end thereof for ground engagement, means for limiting movement of said push member and raising said point out of ground engaging position during use thereof, including a U-shaped member including rollers thereon pivotally attached to said rake frame, a cross bar attached at the end of said beam to engage said U-shaped member for lifting said point out of ground engagement.

JOHN W. RUTLEDGE.